United States Patent [19]
Lee

[11] Patent Number: 6,086,841
[45] Date of Patent: *Jul. 11, 2000

[54] PROCESS FOR PRODUCING CARBON BLACKS

[75] Inventor: Kam Bor Lee, Chelmsford, Mass.

[73] Assignee: Cabot Corporation, Boston, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/008,120

[22] Filed: Jan. 25, 1993

[51] Int. Cl.[7] .................................................... C09C 1/50
[52] U.S. Cl. .................................................. 423/449.1
[58] Field of Search ................................ 423/456, 449.1, 423/450

[56] References Cited

U.S. PATENT DOCUMENTS

| | | | |
|---|---|---|---|
| 4,265,870 | 5/1981 | Mills et al | 423/450 |
| 4,358,289 | 11/1982 | Austin | 23/314 |
| 5,082,502 | 1/1992 | Lee et al. | 134/1 |

FOREIGN PATENT DOCUMENTS 603859  4/1960  Italy .

*Primary Examiner*—Steven Bos
*Assistant Examiner*—Stuart L. Hendrickson

[57] ABSTRACT

A process for producing carbon blacks without the use of a quenching liquid to stop pyrolysis of the effluent in the reactor. In the process of the present invention, the effluent passes from the reaction zone of a furnace carbon black reactor downstream into a lined wall heat exchanger where the effluent is sufficiently cooled to stop pyrolysis. The effluent may be pre-cooled before it enters the lined wall heat exchanger by a quench injecting fluid at a rate substantially lower than in a conventional process wherein all of the fluid is finely atomized in the effluent such that the duration of the presence of liquid phase in the effluent stream is substantially minimized. In a preferred embodiment a cleaning method is utilized to continuously remove deposits from the interior walls of the lined wall heat exchanger and/or the secondary cooler.

6 Claims, 2 Drawing Sheets

PROCESS FOR PRODUCING CARBON BLACKS

FIELD OF THE INVENTION

The present invention relates to a new process for producing furnace carbon blacks.

BACKGROUND

Carbon blacks may be utilized as pigments, fillers, reinforcing agents and for a variety of other applications. Carbon blacks are widely utilized as fillers and reinforcing pigments in the compounding and preparation of rubber compositions and plastic compositions. Carbon blacks are generally characterized on the basis of their properties including, but not limited to, their, surface areas, surface chemistry, aggregate sizes and particle sizes. The properties of carbon blacks are analytically determined by tests known to the art, including iodine adsorption surface area ($I_2No.$), nitrogen adsorption surface area ($N_2SA$), dibutyl phthalate adsorption (DBP), dibutyl phthalate adsorption of the crushed carbon black (CDBP), cetyl-trimethyl ammonium bromide absorption value (CTAB), Tint value (TINT), Dmode and $\Delta D50$. It is advantageous in the compounding and preparation of rubber and plastic compositions to utilize a carbon black that is easily dispersed in the media.

Carbon blacks are also widely utilized as pigments in the formulation of ink compositions, paints and the like, wherein it is generally desirable to use a carbon black pigment which can be easily dispersed. For example, newsink compositions are made in two stages. First the carbon black pigment and a dispersing vehicle, comprising resin, additives, and oil or solvent, are mixed to form a "premix" and then the premix is ground, for example, in a shot mill, to complete the dispersion of the carbon black in the ink composition. Dispersion of the carbon black pigment in the ink composition occurs during the formation of the premix and during the grinding of the premix. A carbon black pigment which is easy to disperse will allow an ink maker to produce an ink in a reduced period of time, which results in improved economy. For the above reasons, and others, it would be advantageous to produce an easily dispersible carbon black pigment.

Carbon blacks are generally produced in a furnace-type reactor by pyrolyzing a hydrocarbon feedstock with hot combustion gases to produce combustion products containing particulate carbon black. A variety of methods for producing carbon blacks are generally known.

In one type of a furnace carbon black reactor, such as shown in U.S. Pat. No. 3,401,020 to Kester et al., or U.S. Pat. No. 2,785,964 to Pollock, hereinafter "Kester" and "Pollock" respectively, a fuel, preferably hydrocarbonaceous, and an oxidant, preferably air, are injected into a first zone and react to form hot combustion gases. A hydrocarbon feedstock in either gaseous, vapor or liquid form is also injected into the first zone whereupon pyrolysis of the hydrocarbon feedstock commences. In this instance, pyrolysis refers to the thermal decomposition of a hydrocarbon. The resulting combustion gas mixture, in which pyrolysis is occurring, then passes into a reaction zone where completion of the carbon black forming reaction occurs.

In another type of a furnace carbon black reactor a liquid or gaseous fuel is reacted with an oxidant, preferably air, in the first zone to form hot combustion gases. These hot combustion gases pass from the first zone, downstream through the reactor, into a reaction zone and beyond. To produce carbon blacks, a hydrocarbonaceous feedstock is injected at one or more points into the path of the hot combustion gas stream. The hydrocarbonaceous feedstock may be liquid, gas or vapor, and may be the same or different than the fuel utilized to form the combustion gas stream. Generally the hydrocarbonaceous feedstock is a hydrocarbon oil or natural gas, however other hydrocarbonaceous feedstocks such as acetylene are known in the art. The first (or combustion) zone and the reaction zone may be divided by a choke or zone of restricted diameter which is smaller in cross section than the combustion zone or the reaction zone. The feedstock may be injected into the path of the hot combustion gases upstream of, downstream of, and/or in the restricted diameter zone. Furnace carbon black reactors of this type are generally described in U.S. Pat. Reissue No. 28,974 and U.S. Pat. No. 3,922,335 the disclosure of each being incorporated herein by reference.

In generally known reactors and processes, the hot combustion gases are at a temperature sufficient to effect pyrolysis of the hydrocarbonaceous feedstock injected into the combustion gas stream. In one type of reactor, such as disclosed in Kester, feedstock is injected, at one or more points, into the same zone where combustion gases are being formed. In other type reactors or processes the injection of the feedstock occurs, at one or more points, after the combustion gas stream has been formed. The mixture of feedstock and combustion gases in which pyrolysis is occurring is hereinafter referred to, throughout the application, as "the effluent". The residence time of the effluent in the reaction zone of the reactor is sufficient, and under conditions suitable, to allow the formation of carbon blacks. In either type of reactor, since the hot combustion gas stream is continuously flowing downstream through the reactor, pyrolysis continuously occurs as the mixture of feedstock and combustion gases passes through the reaction zone. After carbon blacks having the desired properties are formed, the temperature of the effluent is lowered to a temperature such that pyrolysis is stopped, thereby halting the further production of carbon blacks.

In generally known processes the lowering of the temperature of the effluent to stop pyrolysis is accomplished by injecting a quenching fluid, through a quench, into the effluent. As generally known to those of ordinary skill in the art, pyrolysis is stopped when the desired carbon black products have been produced in the reactor. One way of determining when pyrolysis should be stopped is by sampling the effluent and measuring its toluene extract level. Toluene extract level is measured by ASTM D1618-83 "Carbon Black Extractables—Toluene Discoloration". The quench is generally located at the point where the toluene extract level of the effluent reaches an acceptable level for the desired carbon black product being produced in the reactor. After pyrolysis is stopped, the resulting mixture of combustion gases and carbon black generally passes through a heat exchanger to further cool the mixture. This heat exchanger is often advantageously utilized to preheat the combustion air to be utilized in the process while at the same time cooling the quenched mixture from the reactor. Thus, this heat exchanger is often referred to as the combustion air heat exchanger.

After passing through the combustion air heat exchanger the quenched mixture passes through a secondary cooler to further cool the mixture. A secondary quench is typically utilized for the secondary cooler. The purpose of the secondary cooler is to further lower the temperature of the quenched mixture to a temperature such that the bag filter system utilized to separate the carbon blacks will not be damaged.

After further cooling of the mixture by the secondary cooler the cooled mixture passes downstream into separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The temperature of the effluent in the reactor is generally above about 1750° F., often reaching over 3300° F. In conventional processes, the quench that stops pyrolysis cools the effluent to below about 1650° F., often to about 1400° F. The resulting quenched mixture enters the heat exchanger (combustion air heat exchanger) at this temperature and is further cooled by the heat exchanger to about 1000° F. The secondary cooler further cools the mixture to about 500° F., a temperature that will generally not damage the separation means such as the bag filter system.

As set forth above, in heretofore generally utilized carbon black production processes, pyrolysis of the carbon black yielding feedstock in the hot combustion gas stream is stopped by a quench injecting a quenching fluid, typically water. The use of a water quench may disadvantageously result in tiny drops of water being carried with the quenched mixture into the combustion air heat exchanger contacting the heat transfer surfaces thus causing a hard fouling layer of carbon black to build up on the internal heat transfer surfaces of the heat exchanger. This hard fouling layer of carbon black is difficult to remove, and decreases heat transfer through the surface, and thus is disadvantageous.

Also, occasionally in heretofore generally utilized carbon black production processes bits of the hard fouling layer are broken loose and entrained into the product stream due to large changes in the operating conditions of the reactor. These bits of hard fouling layer pass through the reactor and end up mixed in with the collected carbon black product. The material mixed in the carbon black product makes the product difficult to disperse.

Additionally the water droplet evaporation process, of the quench water, causes the formation of micropellets of carbon blacks in the gas stream. These micropellets are more difficult to disperse in the final application media.

SUMMARY OF THE INVENTION

I have discovered a process for producing carbon blacks without the use of a quench to stop pyrolysis of the effluent in the reactor and to lower temperature of the effluent to permit handling by downstream equipment. In the process of the present invention, the effluent passes from the reaction zone of a furnace carbon black reactor downstream into a lined wall heat exchanger where the effluent is sufficiently cooled to stop pyrolysis and to permit handling of the effluent by downstream equipment. The cooled mixture of carbon blacks and combustion gases after exiting the lined wall heat exchanger passes downstream into the equipment used for handling combustion gas streams in a conventional carbon black production process. This equipment generally comprises a combustion air heat exchanger, a secondary cooler and means for separating, collecting and/or drying the carbon black.

The lined wall heat exchanger utilized in the process of the present invention has internal walls made from a highly conducting material that enables heat transfer to be carried out at wall temperatures up to 3200° F. These internal walls contact the hot effluent. The lined wall heat exchanger may dissipate the heat of the effluent into the atmosphere or may be utilized to transfer the heat to another fluid stream.

Suitable highly conducting materials for the manufacture of the internal heat transfer surfaces of the composite wall heat exchanger include materials that are able to withstand temperatures up to 3200° F. without deteriorating and are sufficiently thermally conductive to lower the temperature of the effluent to a temperature wherein pyrolysis is stopped and to permit handling of the effluent by the downstream equipment. Suitable materials include, but are not limited to, silicon carbide and silicon nitride. I have discovered that these materials will provide suitable heat transfer, and resist degradation, even if cracked. The particular design of the lined wall heat exchanger is within the skill of one of ordinary skill in the art.

In the absence of liquid water, the carbon black deposit on the heat transfer surfaces (the fouling layer) becomes very low in bulk density and fragile. These characteristics enable the fouling layer to be easily removed by any method for removing fouling deposits, such as a cleaning apparatus. Preferably the method utilized is one that allows for continuous cleaning of the internal surfaces of the lined wall heat exchanger during the carbon black production process, i.e. while effluent is passing through the lined wall heat exchanger. A preferred method utilizes the cleaning apparatus described in my commonly assigned U.S. Pat. No. 5,082,502, the disclosure of which is incorporated herein by reference.

The process of the present invention produces carbon blacks having improved dispersion characteristics in comparison with carbon blacks produced in a process using a conventional water quench. Improved dispersion characteristics refer to the manner in which the carbon black is dispersed and distributed during the preparation of any formulations or compositions in which it is incorporated. Carbon blacks with better dispersion characteristics will become more evenly distributed throughout the formulation or composition.

As set forth above, the injection of water into the carbon black containing gas stream may cause the formation of micropellets of carbon black that disadvantageously affect the dispersion characteristics of the carbon black. The process of the present invention overcomes this problem by omitting a quench from the carbon black reactor and cooling the effluent through the use of a lined wall heat exchanger.

In a conventional carbon black production process water is also injected in the gas stream by the secondary cooler to cool the gas stream from about 1000° F. to about 500° F., a temperature that will generally not damage the means used to separate and collect the carbon black. This injection of water by the secondary cooler may cause micropellets to form. In an alternative embodiment of the process of the present invention I have discovered a means for avoiding this injection of water and thereby avoiding any problems or disadvantages caused by the injection of water by the secondary cooler.

In a preferred embodiment of the process of the present invention the secondary cooler comprises a conventional heat exchanger referred to hereinafter as an aftercooler. The aftercooler cools the gas stream exiting the combustion air heat exchanger from about 1000° F. to a temperature that permits handling of the gas stream by the carbon black separating and collecting means, generally about 500° F. The heat removed from the gas stream may be dissipated into the atmosphere or utilized to heat another fluid stream. The particular design of the aftercooler is within the skill of one of ordinary skill in the art.

In the preferred process of the present invention, a quench, injecting a quenching fluid to stop pyrolysis in the effluent, is omitted from the reaction zone of the carbon black reactor. However it is also possible, in an alternative embodiment of the process of the present invention, to utilize a quench injecting a quenching fluid at a rate which is substantially less than the rate conventionally utilized for quenching. The quenching fluid is injected at a rate wherein all of the fluid is finely atomized in the effluent such that the duration of the presence of liquid phase in the effluent stream is substantially minimized. This quench may be utilized in the reactor to cool the effluent prior to its entering the lined wall heat exchanger. Use of this quench will reduce the size of the lined wall heat exchanger and thereby reduce the cost of the lined wall heat exchanger. I have discovered that as long as liquid phase water is substantially absent from the partially quenched effluent, the wall fouling in the heat exchanger caused by thermophoresis remains fluffy and light and therefore can easily be removed by increased stream mass velocity or by a cleaning apparatus. The use of a quench, injecting a quenching fluid at a rate wherein all of the fluid is finely atomized in the effluent, in the process of the present invention also produces carbon blacks with improved dispersion characteristics but not exceeding the degree achieved when utilizing a process without the quench.

The process of the present invention may be utilized with any furnace carbon black reactor or process in which carbon black is produced by pyrolysis and/or incomplete combustion of hydrocarbons.

DETAILED DESCRIPTION OF THE INVENTION

According to the process of the present invention, a lined wall heat exchanger is utilized to cool the effluent from a carbon black reactor to a temperature at which pyrolysis stops and to lower the temperature of the effluent to permit handling by downstream equipment. The lined wall heat exchanger may be incorporated into the carbon black production process in the manner depicted in FIG. 1.

Figure 2:
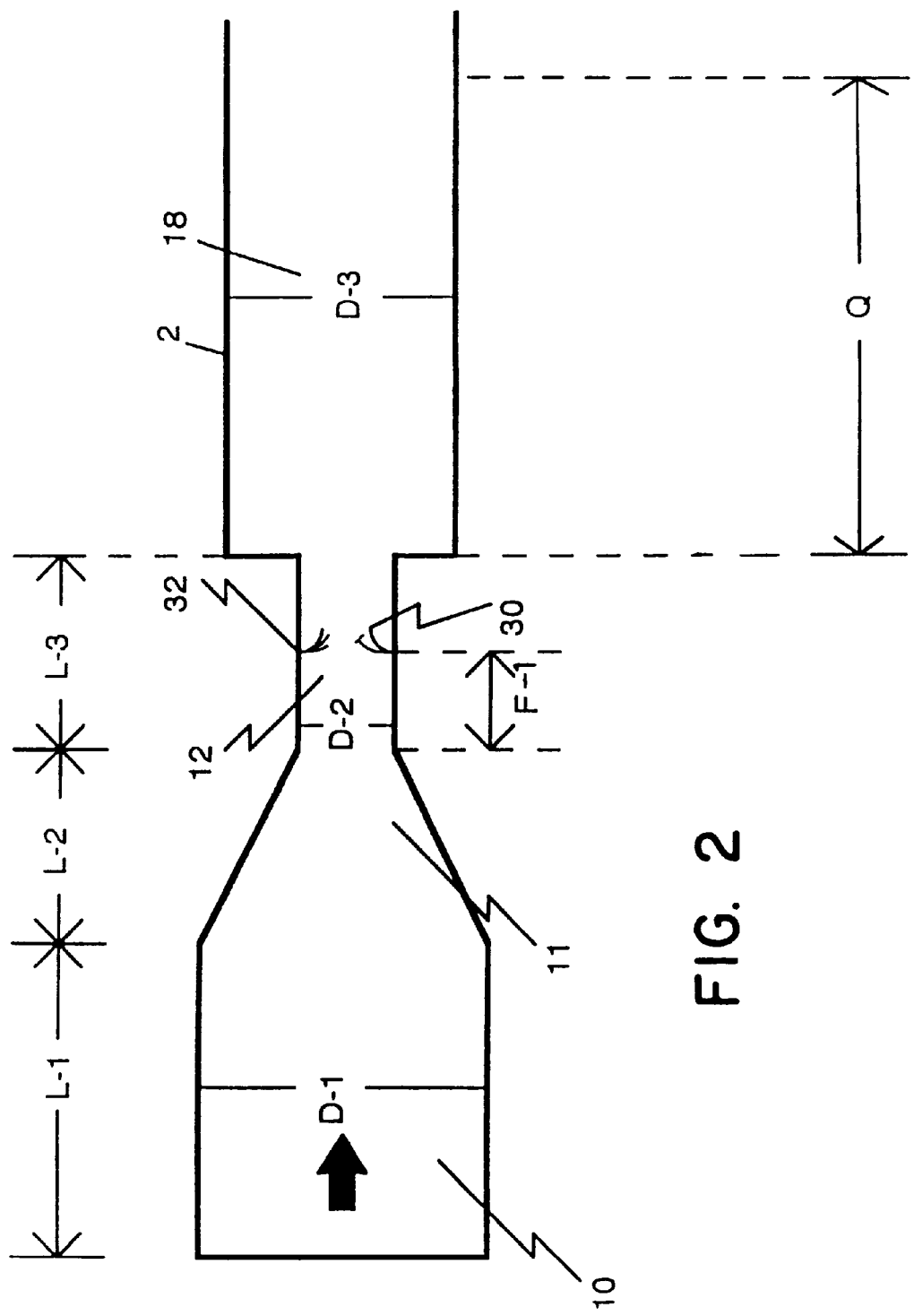
FIG. 2 is a cross-sectional diagram of a carbon black reactor.

A cross-sectional view of a type of carbon black production process in which the process of the present invention may be practiced is depicted in FIG. 2. As will be understood, the process of the present invention does not require any modification of the carbon black reactor and therefore may be practiced in many types of carbon black reactors, such as the types generally discussed in the foregoing Background section.

Figure 1:
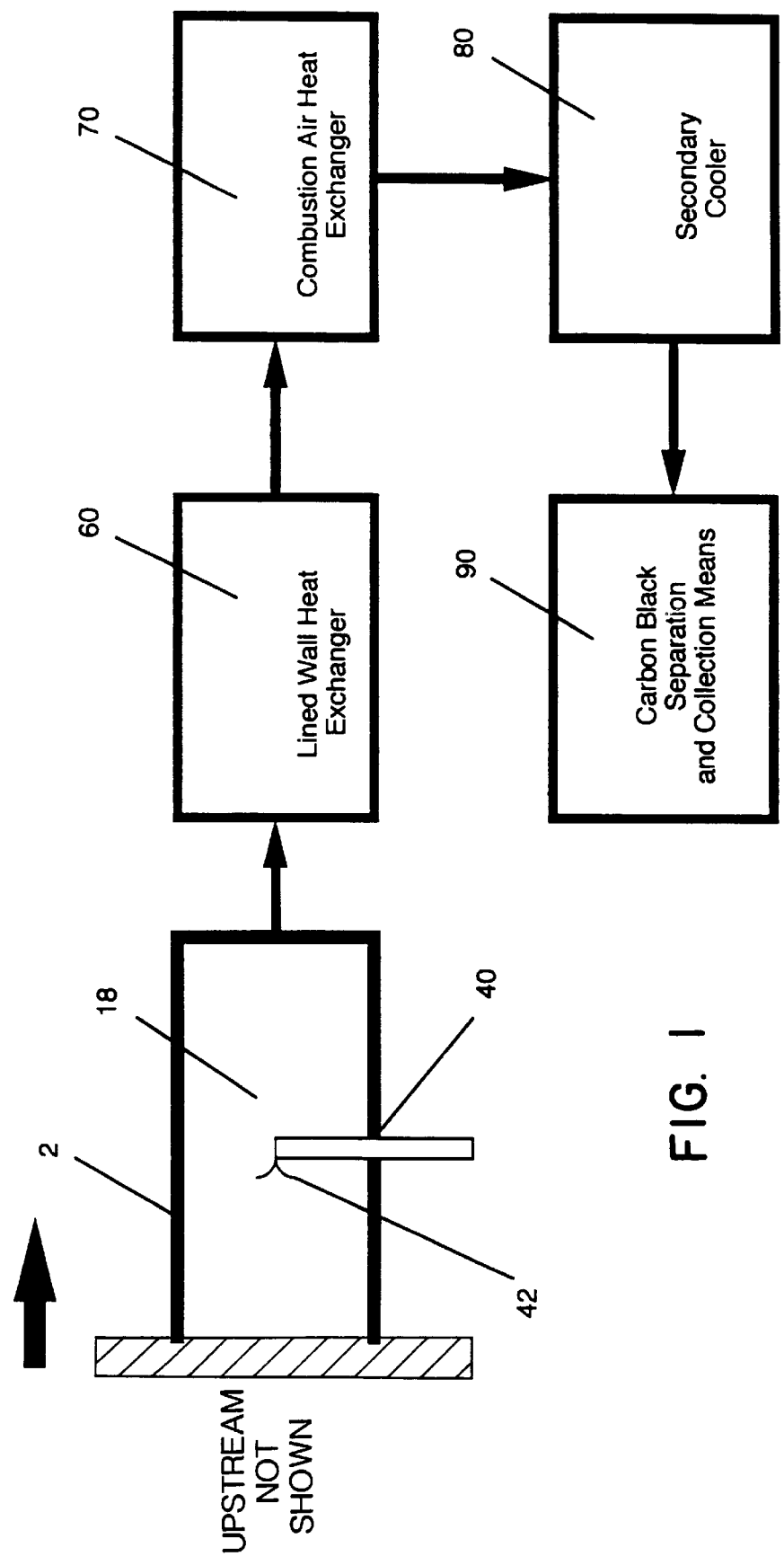
FIG. 1 is a block diagram of the process of the present invention starting from a point in a carbon black production process just upstream of a quench in the reaction zone of a carbon black reactor.

As shown in FIG. 1, lined wall heat exchanger 60 is positioned immediately downstream of reaction zone 18 of carbon black reactor 2. The flow of combustion gases through carbon black reactor 2, is shown by the arrow. As noted in FIG. 1, portions of carbon black reactor 2 upstream of the tail end of reaction zone 18 are not shown. It should also be noted that FIG. 1 is shown in block schematic form.

As shown in FIG. 1, effluent travels from reaction zone 18, into lined wall heat exchanger 60. The internal and external heat transfer surfaces of lined wall heat exchanger 60 allow the effluent to be cooled to a temperature at which pyrolysis ceases and is sufficiently low to prevent damage to the downstream equipment. Generally, the effluent must be cooled from reaction temperature to a temperature of about 1700° F. to stop pyrolysis and prevent damage to the downstream equipment.

In a preferred embodiment of the process of the present invention a cleaning method or apparatus is utilized to continuously clean the lined wall heat exchanger during the carbon black production process. An especially preferred cleaning apparatus is described in U.S. Pat. No. 5,082,502 ("the '502 patent"). The cleaning apparatus and method disclosed in U.S. Pat. No. 5,082,502 comprises a chamber closed at one end, containing means for creating turbulence which is placed in the equipment to be cleaned. The chamber is provided with means for admitting a steady stream of air or oxygen enriched air, means for admitting an explosive gas and means for igniting the gas. A timing means, is also included to control the means for admitting the explosive gas and the ignition means. For cleaning the equipment, an explosive gas/air mixture is created in the chamber and ignited to generate a shock wave which is supersonic at its intial point of contact with the surface to be cleaned. The shock wave dislodges deposits and particles from the equipment that are subsequently carried away by the process stream flowing through the piece of equipment. This cleaning apparatus may be utilized during the carbon black production process to dislodge particles adhering to the internal heat transfer surfaces of the lined wall heat exchanger. The dislodged particles are carried away by the process stream moving through the equipment.

When cleaning with the method and apparatus described in the '502 patent, the cleaning apparatus is located such that the shock waves generated by the apparatus travel through the lined wall heat exchanger. Fouling deposits in the lined wall heat exchanger are dislodged and carried away by the process gas stream.

An advantage of utilizing a cleaning apparatus or method in any of the embodiments of the process of the present invention is that the use of an effective cleaning apparatus or method will remove fouling from the heat transfer surfaces to a sufficient degree to maintain a heat transfer rate that avoids the need for water addition.

In the event that for economic reasons it is desired to reduce the size of the lined heat transfer surfaces in the composite wall heat exchanger, in an alternative embodiment of the process of the present invention, a small amount of water may be introduced into the process stream. In this embodiment, quench 40 located in reaction zone 18 may be utilized to inject quenching fluid 42 into the effluent prior to its entering the lined wall heat exchanger 60. Quenching fluid 42 is injected at a reduced rate, as compared to conventional processes, such that all of the fluid is atomized and vaporized in the effluent before contacting any heat transfer surfaces in the lined wall heat exchanger. This alternative process is also preferably performed with the use of a cleaning apparatus or method for cleaning the lined wall heat exchanger.

After the effluent is cooled, in lined wall heat exchanger 60 the resulting mixture of carbon black and combustion gases, including the materials cleaned from the walls of the lined wall heat exchanger if a cleaning apparatus is utilized, passes downstream into the combustion air heat exchanger 70. By way of example, equipment such as combustion air heat exchanger 70 is conventionally utilized to cool the mixture of carbon black and combustion gases while at the same time preheating the combustion air that is utilized in the combustion zone of the carbon black reactor. Generally, the mixture is cooled from about 1400° F. to about 1000° F.

The mixture of carbon black and combustion gases exiting the combustion air heat exchanger must generally be further cooled by a secondary cooler 80 to a temperature that will not damage the means for separating and collecting the carbon black. Generally, the mixture exiting the combustion air heat exchanger is cooled from about 1000° F. to about 500° F. In a preferred embodiment of the process of the present invention an aftercooler is utilized to cool the mixture of carbon black and combustion gases exiting the combustion air heat exchanger. The aftercooler is a conventional heat exchanger containing sufficient heat transfer surfaces to reduce the temperature of the mixture exiting the combustion air heat exchanger to a temperature that will not damage the means for separating and collecting the carbon black. The design of this heat exchanger, used as an aftercooler, is within the skill of one of ordinary skill in the art.

Preferably a cleaning method or apparatus is utilized to continuously clean the aftercooler during the carbon black production process. An especially preferred cleaning apparatus is described in U.S. Pat. No. 5,082,502 ("the '502 patent").

After the mixture of carbon black and combustion gases is further cooled, it travels into means 90 for separating and collecting the carbon black. Generally the separation of the carbon black from the gas stream is accomplished by conventional means such as a precipitator, cyclone separator or bag filter. This separation may be followed by dry pelletizing, if desired.

The lined wall heat exchanger utilized in the process of the present invention has internal walls, which contact the hot effluent, made from a highly conducting material that enables heat transfer to be carried out up to 3300° F. Suitable materials include, but are not limited to, silicon carbide and silicon nitride. The configuration of the lined wall heat exchanger is within the skill of those of ordinary skill in the art.

The process of the present invention may be utilized to produce carbon blacks having improved dispersion characteristics. The effectiveness and advantages of the present invention will be further illustrated by the following examples.

The following testing procedures are used in the determination and evaluation of the analytical properties of the carbon blacks produced in the Examples below.

The $I_2$No. was determined according to ASTM D1510. The Tint of the carbon blacks was determined according to ASTM Test Procedure D3265-85a. The DBP of the carbon black pellets was determined according to the procedure set forth in ASTM D2414. Toluene extract level was measured by ASTM D1618-83.

EXAMPLES 1–3

The process of the present invention was utilized to produce carbon black in the following manners.

A carbon black reactor, such as the one depicted in FIG. 2 was utilized to produce the carbon blacks. FIG. 2 depicts a furnace carbon black reactor 2, having a combustion zone 10, which has a zone of converging diameter 11, transition zone 12, and reaction zone 18. The diameter of the combustion zone 10, up to the point where the zone of converging diameter 11, begins is shown as D-1; the diameter of zone 12, as D-2; and the diameter of zone 18, as D-3. The length of the combustion zone 10, up to the point where the zone of converging diameter 11, begins is shown as L-1; the length of the zone of converging diameter is shown as L-2; and the length of the transition zone is shown as L-3. Other details of the modular furnace carbon black reactor may be found for example in the description contained in U.S. Pat. No. 3,922,335, the disclosure of which is herein incorporated by reference.

To produce the carbon blacks hot combustion gases were generated in combustion zone 10, by reacting a natural gas fuel with air. The ratio of air to natural gas was about 30:1. To facilitate the generation of hot combustion gases, the oxidant stream was preheated.

The hot combustion gas stream flowed downstream from zones 10 and 11 into zones 12 and then 18. The direction of the flow of hot combustion gases is shown in the figure by the arrow. Carbon black-yielding feedstock 30, was introduced at point 32 (located in zone 12). The carbon black-yielding hydrocarbon feedstock utilized had the properties set forth in Table 2 below. The distance from the end of the zone of converging diameter 11, downstream to point 32, is shown in FIG. 2 as F-1. The amount of feedstock introduced is set forth in Table 1. The carbon black-yielding feedstock 30, was injected radially in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to carbon black of the present invention. The mixture of carbon black-yielding feedstock and hot combustion gases flows downstream through zone 12 into zone 18.

The specific reactor conditions and geometry are set forth in Table 1.

TABLE 1

| | Reactor Geometry | | |
|---|---|---|---|
| | Example 1 | Example 2 | Example 3 |
| D-1, in. | 7 | 7 | 7 |
| D-2, in. | 4.2 | 4.2 | 4.2 |
| D-3, in. | 36 | 36 | 36 |
| L-1, in. | 24 | 24 | 24 |
| L-2, in. | 12 | 12 | 12 |
| L-3, in. | 9 | 9 | 9 |
| F, in. | 4.5 | 4.5 | 4.5 |
| Q, ft | Not Used | 25 and 38* | Not Used |
| Oil Inj. Pt. 32,) Tips # × Size, in.) | 4 × 0.76 | 4 × 0.76 | 4 × 0.76 |
| Oil Rate 32, gph | 140 | 140 | 140 |
| Oil Preheat, 32, °F. | 320 | 320 | 320 |
| C. Air, kscfh | 55.0 | 55.0 | 55.0 |
| C. Air Preheat °F. | 850 | 850 | 850 |
| Natural Gas, kscfh | 1.83 | 1.83 | 1.83 |
| Air to Burn Ratio | 10:1 | 10:1 | 10:1 |
| Quench Rate, gph | N.A. | 0–40 | N.A. |
| Cleaning Apparatus | No | No | Yes |

Inj. = Injection; C. = combustion; Press. = pressure; 32 = Point 32 on Figure 1; gph = gallons per hour; psi = pounds/square inch; in. = inches; ft. = feet; °F. = degrees Fahrenheit; kscfh = standard cubic feet per hour, in thousands; N.A. = not applicable
*In this run two quenches were utilized. One at 25 feet and one at 38 feet.

The fuel utilized in each combustion reaction was natural gas. The liquid feedstock utilized in each run had the properties indicated in Table 2 below.

TABLE 2

Feedstock Properties

| | |
|---|---|
| Hydrogen/Carbon Ratio | 0.94 |
| Hydrogen (wt. %) | 7.2 |
| Carbon (wt. %) | 91.6 |
| Sulfur (wt. %) | 0.5 |
| A.P.I. Gravity 15.5/15.6 | −2.7 |
| C(60)F [ASTM D-287] | −2.7 |
| Specific Gravity 15.5/15.6 C(60)F [ASTM D-287] | 1.099 |
| Viscosity, SUS (130° F.) [ASTM D-88] | 110 |
| Viscosity, SUS (210° F.) [ASTM D-88] | 42 |
| BMCI (Visc-Grav) | 143 |

The effluent flowed downstream from the carbon black reactor into a lined wall heat exchanger. The lined wall heat exchanger, and the remainder of the production equipment were arranged in the manner shown in FIG. 1. An aftercooler was utilized as the secondary cooler, 80 in FIG. 1, immediately upstream of the carbon black separation and collection means.

The lined wall heat exchanger had internal heat transfer surfaces made from silicon carbide (SiC), a material having high thermal conductivity, high temperature integrity and good thermal shock resistance. SiC tubes 3 feet long with a 6.75 inch internal diameter were fitted snugly into 8 inch inner diameter sch 10 stainless steel pipes 24 feet long to form four 24 feet long legs. The external areas of the stainless steel pipes were spray painted black with a high temperature paint to assist in radiative heat loss to the atmosphere.

The temperature of the process stream at the entrance and exit of the lined wall heat exchanger was measured during each exemplary production run. The average temperature of the effluent at the entrance and exit of the lined wall heat exchanger was as shown in Table 3.

TABLE 3

| RUN | Temperature at Entrance of Lined Wall Heat Exchanger | Temperature at Exit of Lined Wall Heat Exchanger |
|---|---|---|
| Example 1 | 2200° F. | 1510° F. |
| Example 2 | 2200° F. | 1510° F. |
| Example 3 | 2200° F. | 1510° F. |

As indicated in Table 1, Quench 40 shown in FIG. 2 was not utilized in runs 1 and 3. However, two quenches were utilized in run 2 and were placed 25 feet and 38 feet respectively from the beginning of the reaction zone. During the production run water was introduced through each quench at a total rate up to 40 gallons per hour. The rate of addition of quench water was such that all of the fluid was finely atomized in the effluent and little or no water remained in the liquid phase. In contrast, under conventional process conditions, quench fluid (usually water) is introduced at a rate of up to 150 gallons per hour and substantial amounts remain in the liquid phase.

In each exemplary production run, after exiting the lined wall heat exchanger the process stream passed downstream through a conventional combustion air heat exchanger and then through an aftercooler.

As indicated in Table 1, in exemplary run 3 a cleaning method was utilized to remove deposits from the walls of the lined wall heat exchanger. In order to continuously clean the internal surfaces of the lined wall heat exchanger, four cleaning apparatus of the type described in U.S. Pat. No. 5,082,502 were utilized in the process. The diameter of the chamber in which the shock wave was generated (chamber 12, in FIG. 1 of the '502 patent) was 2 inches. Water cooled jackets were utilized around the chamber.

Each cleaning apparatus was positioned approximately 1 to 3 inches from the inlet of the lined wall heat exchanger and generated a shock wave that traveled co-currently with the process stream traveling through the heat exchanger. Each cleaning apparatus was set to fire, i.e. generate a shock wave, once every four seconds and in series with each other cleaning apparatus. Thus a shock wave was generated every second.

The carbon blacks produced in each run were then separated and collected using conventional means employing bag filters. The analytical properties of the carbon blacks produced in each exemplary run, and a control carbon black were determined by the aforementioned testing methods. The results are set forth in Table 4.

TABLE 4

Carbon Black Properties

| | EXAMPLE 1 | EXAMPLE 2 | EXAMPLE 3 | CONTROL |
|---|---|---|---|---|
| $I_2$ No. ($m^2/g$) | 68.5 | 73 | 70 | 68 |
| DBP (cc/100 g) | 44.6 | 48 | 44.5 | 46 |
| Tint (%) | 104 | 105 | 106 | 104 |

EXAMPLE 4

The dispersion characteristics of the carbon blacks produced in the processes described in Examples 1, 2 and 3 were evaluated in an ink formulation. For comparison purposes the control carbon black set forth in Table 4 was also evaluated.

The dispersion characteristics of each carbon black was measured by the following procedure, which is Cabot Test Procedure 141.0. The following equipment is utilized in the test procedure:

1. Three-roll mill
2. Platform balance
3. NPIRI Grindometer #2 and #3
4. Vandercook Proof Press
5. Laray Viscosimeter
6. 50 mm×75 mm microscope slide
7. Steel spatulas The three-roll mill is set to the following conditions:

1. Roll Span—6 inches
2. Temperature—100° F.
3. Front Roll Gap: Left Side=0.0176 inch; Right Side=0.112 inch
4. Through put rate (A function of rear roll setting)
    MOGUL® L carbon black=24–28 seconds
    REGAL® 500R carbon black=25–30 seconds
    (MOGUL® and REGAL® are registered trademarks for carbon blacks manufactured and sold by Cabot Corporation, Boston, Mass.)

A 50 gram Litho No. 1 ink formulation was prepared using 24% by weight (12 grams) carbon black and 76% by weight (38 grams) Litho No. 1 Pale Oil a product manufactured by Lawter International, Northbrook Ill. Litho No. 1 Pale Oil is a heat bodied alkali refined linseed oil with a viscosity of 22.7 to 25.5 poise. The Litho No. 1 Pale Oil is weighed into a suitable container and then the carbon black is weighed into the same container. The carbon black is wetted into the Litho No. 1 Pale oil by stirring in at a rate of one stroke per second with a spatula. The paste is then passed through the three-roll mill four times. After each of the first three passes, a one-half ounce sample is taken. After the fourth pass, the remainder is canned off into a 2 ounce can.

Dispersion is determined using the G-2 NPIRI, Grindometer. Ink samples are placed across the deep end of the grooves about half an inch from the end of the block. Approximately 0.5 ml of ink is sufficient for a path one inch wide. The scraper is grasped with both hands in a nearly vertical position and the ink is drawn down on the block. The drawdown is made by a smooth, steady stroke that should take at least 4 seconds. Sufficient pressure must be used so that the center and side portion of the block are definitely wiped clean. The points at which 5 and 10 scratches appear are noted and recorded in microns. Each gauge division is 2.5 microns. The sand level is noted at the point where 5 or more specks appear.

The foregoing test procedure was utilized to determine the dispersion characteristics of the carbon blacks produced in Examples 1, 2 and 3 as well as a control carbon black. The results were as follows:

TABLE 5

Carbon Black Dispersion Characteristics

| Carbon Black | 1st Pass | | 2nd Pass | | 3rd Pass | | 4th Pass | |
|---|---|---|---|---|---|---|---|---|
| | Scratch | Sand | Scratch | Sand | Scratch | Sand | Scratch | Sand |
| Example 1 | 0 | 15 | 0 | 10 | 0 | 10 | 0 | 0 |
| Example 2 | 0 | 33 | 0 | 10 | 0 | 10 | 0 | 0 |
| Example 3 | 0 | 20 | 0 | 0 | 0 | 0 | 0 | 0 |
| Control | 6 | 50 | 3 | 35 | 0 | 22 | 0 | 18 |

These results show that the carbon blacks produced in Examples 1, 2 and 3 by the processes of the present invention have improved dispersion characteristics in comparison to the control carbon black.

It should be clearly understood that the forms of the present invention herein described are illustrative only and are not intended to limit the scope of the invention.

I claim:

1. A process for producing carbon blacks comprising: passing a stream of hot combustion gases through a reactor; injecting feedstock into the stream of hot combustion gases at one or more points to form an effluent and start pyrolysis of the feedstock in the effluent; cooling the effluent after the formation of carbon blacks by passing the effluent through a lined wall heat exchanger in order to stop pyrolysis and obtain a resultant process stream of combustion gases and carbon black; further cooling the process stream in a secondary cooler without adding any cooling liquid to a temperature that prevents damage to the means utilized for separating and collecting the carbon black product; and separating and collecting carbon black product.

2. The process of claim 1 further comprising injecting a quenching fluid into the effluent prior to its passing into the lined wall heat exchanger wherein the quenching fluid is injected into the effluent at a rate wherein all of the fluid is atomized to minimize the duration of the presence of the quenching fluid in the liquid phase in the effluent stream.

3. The process of claim 1 wherein the secondary cooler is a heat exchanger.

4. The process of claim 1 further comprising continuously removing any deposits formed on the walls of the lined wall heat exchanger during the ongoing carbon black production process.

5. The process of claim 1 further comprising continuously removing any deposits formed on the walls of the secondary cooler during the ongoing carbon black production process.

6. The process of claim 4 further comprising continuously removing any deposits formed on the walls of the secondary cooler during the ongoing carbon black production process.

* * * * *